Patented July 1, 1952

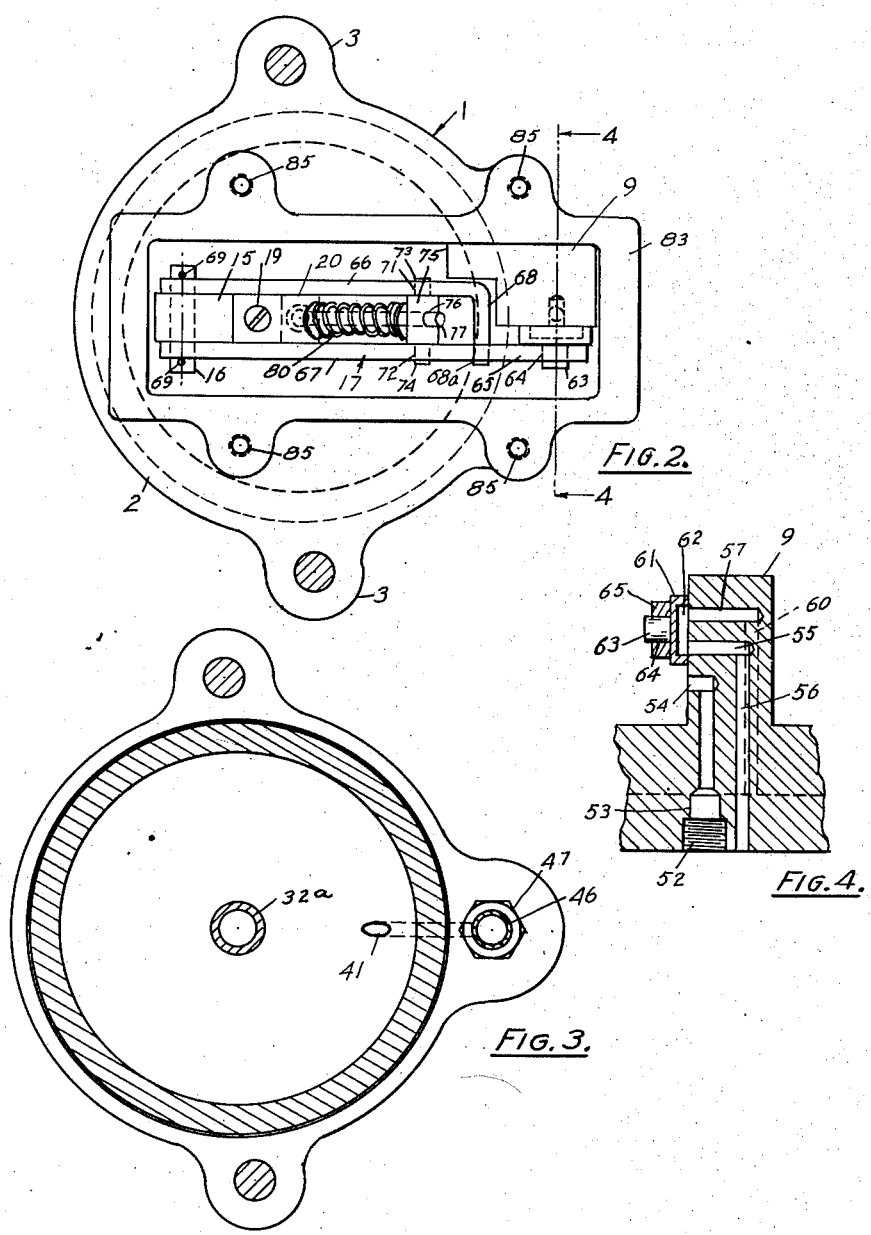

2,601,848

UNITED STATES PATENT OFFICE 2,601,848

FLUID MOTOR AND VALVE ASSEMBLY

Ernest H. Dahlberg, Erie, Pa.

Application March 18, 1949, Serial No. 82,177

9 Claims. (Cl. 121—164)

This invention relates generally to fluid operated actuating devices having automatic control means therefor.

No suitable means has heretofore been provided for controlling a fluid operated piston or other similar means for creating fluid pressure in a line with the result that the actuating device must be closely watched and it must be manually controlled; otherwise, the pressure in the line increases to an excessive amount resulting in the bursting of the line thus creating a hazard to life and property. The manually operated control means heretofore used have been exposed and partial opening of the valves results. No means has heretofore been provided to automatically control an actuating device for a reciprocating piston or the like in a cylinder so as to maintain a predetermined amount of pressure in the fluid line such as in the lubricant line leading to a lubricating gun.

It is, accordingly, an object of my invention to overcome the above and other defects in fluid operated actuating devices and control means therefor and it is more particularly an object of my invention to provide a fluid operated actuating device having automatic control means therefor which is simple in construction, economical in cost, economical in manufacture, and efficient in operation.

Another object of my invention is to provide a fluid operated actuating device having automatic control means therefor having no exposed parts for manual manipulation thereof.

Another object of my invention is to provide a fluid operated actuating device having automatically operated control means therefor wherein the control valve has an exceptionally fast tripping action.

Another object of my invention is to provide automatically operated control means in an actuating device for maintaining a predetermined fluid pressure in a line.

Another object of my invention is to provide a fluid operated actuating device having automatically operated control means therefor for automatically starting and stopping the actuating device upon a predetermined back pressure in the fluid line.

Another object of my invention is to provide a novel structure and assembly and combination of parts in a fluid operated actuating device having automatically operated control means therefor.

Other objects of my invention will become evident from the following detailed description, taken in conjunction with the accompanying drawings, in which Fig. 1 is a vertical sectional view of an illustration of my novel fluid operated actuating device having automatically operated control means therefor;

Fig. 2 is a top plan view of my novel actuating device having automatically operated control means therefor with the cap removed;

Fig. 3 is a view taken on the line 3—3 of Fig. 1; and

Fig. 4 is a fragmentary sectional view taken on the line 4—4 of Fig. 2.

Figure 1:
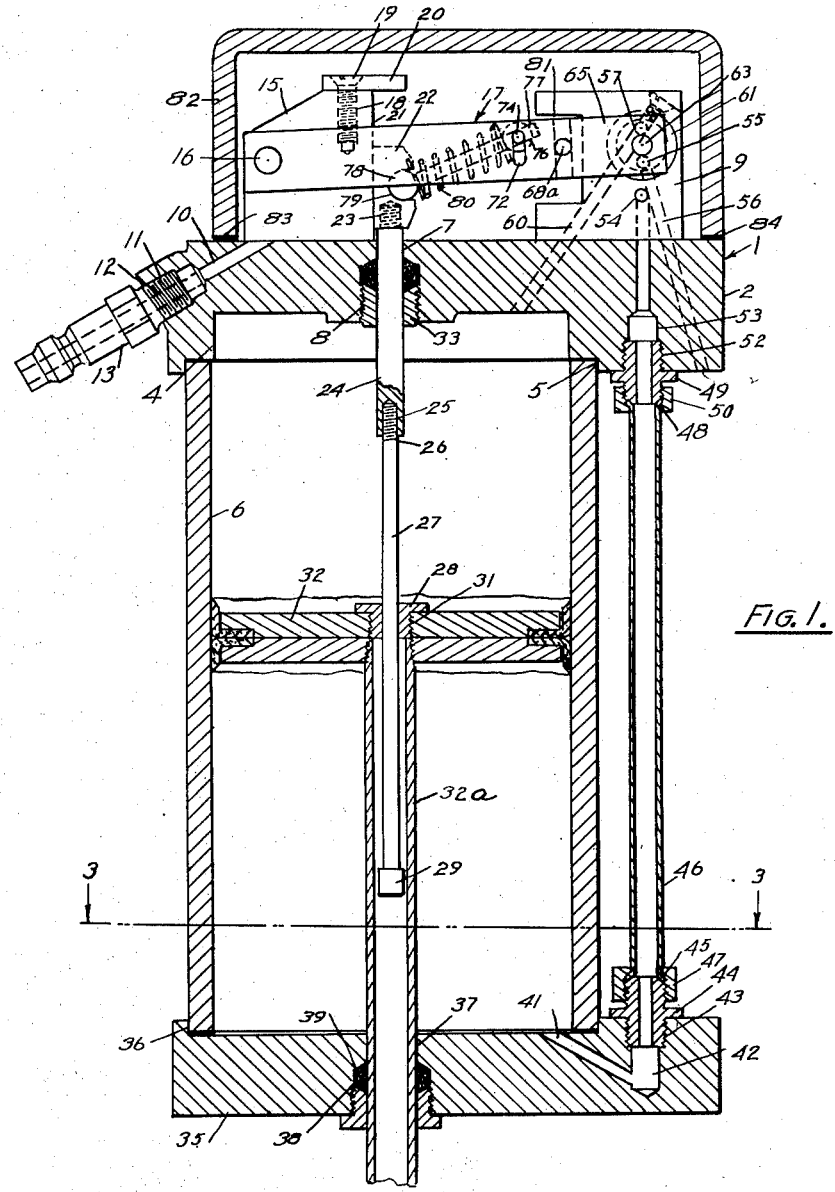

Referring now to the drawings, I show in Figs. 1 to 4 inclusive a casing 1 comprising a base 2 with radially outwardly extending apertured ears 3 for connection to any suitable supporting means, a recessed cylindrical portion 4 on the under side of said base having a counterbore 5 for receiving the upper end of a cylinder 6, an aperture 7 disposed centrally of said cylindrically shaped recess 4 and having a threaded counterbore 8, a vertically extending valve block 9 and an angularly extending aperture 10 having a threaded counterbore 11 for receiving the threaded end 12 of a hose coupling 13 leading to a source of fluid. The base 2 also has a vertically extending support 15 having a transversely extending aperture for receiving a shaft 16 to pivot one end of valve arm 17. The support 15 has a threaded recess 18 on the upper side thereof for receiving a threaded screw 19 to secure a stop member 20 on the upper end thereof. The stop member 20 limits the vertical movement of the slide 22 engaging the face or side 21 of the support 15 which is threadably engaged with the upper threaded end 23 of a shaft 24 which extends through the aperture 7 in the base 2. The shaft 24 has a threaded bore 25 for threadably engaging the threaded end 26 of a rod 27 slidable in a flanged threaded member 28 and having an enlarged lower end 29, the purpose of which will be hereinafter described. The threaded member 28 threadably engages a threaded aperture 31 centrally of a piston 32 which reciprocates in the cylinder 6. The piston 32 also has threadably engaged therewith a tubular shaft 32a which may be attached to a piston or any other similar device for reciprocation thereof for creating pressure in a fluid line. A packing gland 33 slidably engages the threaded counterbore 8 of the base 2 and surrounds the shaft 24 in sealing engagement therewith. A head 35 having a cylindrical recessed portion 36 in which the lower end of the cylinder 6 is seated has a central aperture 37 with a threaded counterbore 38 for slidably receiving the tubular shaft 32a. Suitable packing 39 is disposed in the threaded counterbore 38 of the head 35 to sealingly engage the shaft 32a. The head 35 has an angularly extending aperture 41 terminating in a vertically extending recess 42 with a threaded counterbore 43. A threaded adapter 44 threadably engages the threaded counterbore 43 and is connected to the flared end 45 of a tubular line 46 by a threaded connecting member 47. The upper flared end 48 of the tubular member 46 is connected to an adapter 49 by a threaded connecting member 50, the adapter 49 being in turn threadably engaged with a threaded counterbore 52 of an aperture 53 which terminates in a transverse recess 54 in the block 9. A second transverse recess 55 in the block 9 is connected in fluid flow relationship with an aperture 56 which leads to atmosphere in the case that air is being used or it may lead to the reservoir or other source of fluid in the case of gases or liquids. A third transverse recess 57 connects in fluid flow relationship with an angularly extending aperture 60 in the base 2 which leads to the upper side of the piston 32 in the cylinder 6. The recesses 54, 55, and 57 in the block 9 are in vertical alignment and they are engaged by a cylindrical slide valve 61 having a cupped portion 62 which places the recesses 55 and 57 or the recesses 55 and 54 respectively in fluid flow relationship in accordance with the position of the slide valve 61. The slide valve 61 has an outwardly extending stub shaft 63 which fits into an aperture 64 in the end 65 of member 67 of arm 17. The arm 17 comprises spaced members 66 and 67, the member 66 being bent at right angles at 68 and the end 68a thereof is reduced to engage an intermediate aperture in the member 67. One of the ends of each of the members 66 and 67 are apertured to receive the transverse shaft 16 supported in the apertured support member 15, cotter pins 69 securing the members 66 and 67 on the shaft 16. The members 66 and 67 have vertically extending, elongated slots 71 and 72 for receiving stub shafts 73 and 74 extending outwardly from a square rotatable member 75 having an aperture 76 therein for receiving the end of a pin 77, the pin 77 having an enlarged cylindrical shaped head 78 for seating in a cylindrically shaped groove 79 in the slide 22. A comparatively heavy coil spring 80 is disposed around the pin 77 between the rotatable member 75 and the enlarged head 78 of the pin 77. The block 9 has a cut away portion 81 to permit limited up and down movement of the arm 17. A rectangular shaped cap 82 is disposed over the rectangular shaped seat 83 of the base 2 enclosing the block 9 and support member 15, the arm 17, and all the other moving parts of the control members of my invention to prevent any manual intervention. A suitable gasket 84 is disposed between the cap 82 and the seat 83 on the base 2 to seal air or other fluid in the cap 82. The cap 82 is secured on the seat 83 by screw bolts (not shown) threadably engaging the threaded apertures 85 in the seat 83. The spring 80 must be made of such strength that it will overcome the pressure of the fluid under pressure in the cap 82 utilized for actuating the piston 32 in the cylinder 6 and more than one spring may be used.

In the operation of my device, the pressure of the source of fluid is determined for actuating my device and the proper spring 80 is disposed on the pin 77 in the position shown in Figs. 1 and 2. One or more springs may be used without departing from my invention inasmuch as where higher pressures are used, it may be desirable to use more than one spring to overcome the pressure of the fluid in the cap 82. When the slide valve 61 is in the position shown in the drawings, placing the recess 57 leading to the aperture 60 and to the top of the piston 32, and the recess 55 in fluid flow relationship, the fluid will be exhausted from the upper part of the cylinder 6 through the recess 55 and aperture 56 and air or other fluid in the cap 82 will pass through the recess 54, the aperture 53, the tubular member 46, the aperture 42, and aperture 41 in the head 35 to the bottom of the cylinder 6 thereby forcing the piston 32 upwardly and causing upward movement of the shaft 32a connected to any suitable member for creating pressure in a fluid line. When the piston 32 rises to a point where the flanged member 28 strikes the bottom of the shaft 24, it causes the shaft 24 and rod 27 to move upwardly thereby moving the slide 22 upwardly on the face 21 of the support 15. When the enlarged head 78 of the pin 77 movable with the slide 22 passes a predetermined point of its upward movement, the cross shaft 76 slides downwardly in the elongated slots 71 and 72 in the members 66 and 67 thereby causing the arm 17 to snap downwardly and move the valve 61 downwardly to open the recess 57 leading to the aperture 60 and to the top of the piston 32. The slide valve 61 moves over the recesses 54 and 55 thereby placing them in fluid flow relationship so that air or other fluid may be exhausted outwardly through the recess 55 and aperture 56 from the lower end of the cylinder 6. The air or other fluid passing through the recess 57 and aperture 60 moves the piston 32 and shaft 32a downwardly whereby the enlarged end 29 on the rod 27 is engaged by the flanged member 28 on the piston 32 thereby pulling the rod 27, shaft 24, and slide 22 downwardly. When the enlarged head 78 of the pin 77 moves downwardly a predetermined distance, the stub shafts on the cross shaft 76 slide upwardly in elongated slots 71 and 72 in the members 66 and 67 causing the arm 17 to snap upwardly moving the slide valve 61 to a position covering the recesses 55 and 57 as shown in Fig. 4 thereby venting the upper side of the piston 32 to atmosphere or to a reservoir or other container for fluids.

It will be evident that my novel actuating device may be used in conjunction with any fluid operated hydraulic cylinder with a piston moving therein by connecting the recess 54 and aperture 53 and recess 57 and aperture 60 in fluid flow relationship with opposite ends of the cylinder and the recess 55 and aperture 56 in fluid flow relationship with the reservoir or source of fluid for operating the hydraulic pump or motor. The operation with a liquid or a gaseous fluid is identical.

It will be evident from the foregoing description that I have provided a novel fluid operated actuating device with automatically operated control means which automatically controls the admission and exhaust of fluid from a cylinder, which stops and starts easily, which has no exposed parts for a manual manipulation, which has a fast tripping action, which does not permit a port to be partially opened, which is positive in operation, which will operate only against a predetermined back pressure, and which is efficient in operation.

It will be evident upon inspection that when the back pressure on the shaft 32a and piston 32 becomes greater than the pressure of the fluid in the cap 82 actuating the piston 32, the piston 32 and the shaft 32a will be stopped as the pressure in the cap 82 will not be capable of working against a higher pressure. Thus, only a predetermined pressure will be maintained in the outgoing line and my novel actuating device will automatically stop and start to maintain such a pressure.

Various changes may be made in the specific embodiment of my invention without departing

What I claim is:

1. An automatically controlled fluid motor and valve assembly for connection to a source of fluid under pressure comprising an enclosed sealed casing, a source of fluid under pressure for said casing, a cylinder, a piston movable in said cylinder, a member in said casing having aligned ports, the outer ports being in fluid flow relationship with respective opposite ends of said cylinder and said casing and the other of said ports being adapted to exhaust fluid from either end of said cylinder, a cupped slide valve adapted to cover said exhaust port and one or the other of said outer ports alternately, said valve placing said ports over which it is positioned in fluid flow relationship, an arm upon which said slide valve is mounted, spring means for urging said arm to alternate covering positions in relation to said port after a predetermined movement in the travel of said arm, and a rod actuated by said piston for moving said arm.

2. A fluid operated, automatically controlled motor and valve assembly for connection to a source of fluid under pressure comprising a sealed casing, a source of fluid under pressure for said casing, a pivoted arm in said casing, a cylinder attached to said casing, a piston movable in said cylinder, a member having three aligned apertures in said casing, the two outer apertures being in fluid flow relationship with respective opposite ends of said cylinder and said casing, a cup shaped slide valve adapted to engage said center aperture and one or the other of said outer apertures alternately, carried on said pivoted arm, and means actuated by said piston for actuating said arm, said valve alternately placing said outer apertures in fluid flow relationship with said center aperture to exhaust fluid from said cylinder.

3. A fluid operated, automatically controlled fluid motor and valve assembly as set forth in claim 2 wherein said means for actuating said arm comprises a slide in said casing, a rod connecting said slide and slidably engaging said piston, means for moving said rod upwardly or downwardly upon a predetermined movement of said piston in either direction, and means connecting said slide and said arm for moving said arm upwardly and downwardly.

4. A fluid operated, automatically controlled fluid motor and valve assembly as set forth in claim 3 wherein the means connecting said slide and said arm comprise a spring adapted to urge said arm upwardly or downwardly upon a predetermined respective upward or downward movement of said slide.

5. A fluid operated, automatically controlled fluid motor and valve assembly as set forth in claim 3 wherein said slide has a circular groove for receiving the enlarged head of a pin, a cross member having an end thereof movable in an elongated, vertically extending slot in said arm, and a spring disposed between said cross member and said enlarged head thereof, the end of said pin extending through an aperture in said cross member to permit slidable movement of said pin in relation to said cross arm.

6. A fluid operated, automatically controlled motor and valve assembly adapted to be connected to a source of fluid under pressure comprising a cylinder, a piston reciprocable in said cylinder, a closed sealed chamber, a source of fluid for said chamber, a member having aligned ports, two of said ports being in fluid flow relationship with opposite ends of said cylinder and said casing and a third port for exhausting fluid from opposite ends of said cylinder, a cupped valve movable over said ports for placing said third exhaust port and one or the other of said ports connecting the ends of said cylinder in fluid flow relationship alternately, a pivoted arm upon which said valve is mounted, a vertical elongated slot in said arm, a cross arm movable in said slot, a slide, a spring disposed between said slide and said cross arm for urging said arm upwardly and downwardly after it travels a predetermined distance in an upward or a downward direction, and a rod attached to said slide and slidably engaging said cylinder for reciprocating said slide.

7. A fluid operated, automatically controlled motor and valve assembly as set forth in claim 6 wherein said rod connecting said slide slidably engages an apertured member centrally of said piston and it has a shoulder formed on the side of said rod adjacent said slide and an enlarged head on the end thereof to engage said member attached to said piston upon movement thereof to opposite ends of said piston to actuate said slide.

8. A fluid operated, automatically controlled motor and valve assembly comprising a cylinder, a closed sealed chamber, a member in said chamber having charging ports in fluid flow relationship with opposite ends of said cylinder and said casing and a third port for exhausting fluid from said cylinder, a cupped slide valve for covering said exhaust port and one or the other of said charging ports wherein they are in fluid flow relationship when said valve covers same, a pivoted arm to which said valve is connected having parallel members with elongated slots, a slide in said chamber having a grooved cylindrical portion, a pin having an enlarged head disposed in the slots of said slide and having the other end thereof slidably engaged with said cross shaft, a coil spring surrounding said pin between said slide and said cross shaft, and means actuated by said piston for reciprocating said slide upon a predetermined movement thereof.

9. A fluid operated, automatically controlled motor and valve assembly as set forth in claim 8 wherein said means for actuating said slide comprises a rod attached to said slide and extending into said cylinder and through a centrally apertured portion in said piston, said rod having an abutting shoulder formed on one side of said piston and an enlarged head on the end thereof opposite to said slide, said piston being adapted to abut the shoulder and enlarged end of said rod alternately upon a predetermined movement thereof in said cylinder to actuate said slide.

ERNEST H. DAHLBERG.

REFERENCES CITED

The following references are of record in the file of this patent:

UNITED STATES PATENTS

| Number | Name | Date |
| --- | --- | --- |
| 647,351 | Wood | Apr. 10, 1900 |
| 1,094,811 | Reagan et al. | Apr. 28, 1914 |
| 1,282,841 | Iles | Oct. 29, 1918 |
| 2,268,898 | Pelouch | Jan. 6, 1942 |
| 2,448,459 | Palm | Aug. 31, 1948 |

FOREIGN PATENTS

| Number | Country | Date |
| --- | --- | --- |
| 8,116 | Great Britain | Apr. 13, 1908 |